United States Patent [19]
Cranor

[11] 3,789,607
[45] Feb. 5, 1974

[54] INTEGRAL CAST PIN TYPE CHAIN
[75] Inventor: Dennis A. Cranor, Milwaukie, Oreg.
[73] Assignee: Esco Corporation, Portland, Oreg.
[22] Filed: May 30, 1972
[21] Appl. No.: 257,618

[52] U.S. Cl. ................................................. 59/84
[51] Int. Cl. ............................................. F16g 15/12
[58] Field of Search.. 59/78, 80, 82, 84, 90, DIG. 1; 74/250 R; 249/57

[56] References Cited
UNITED STATES PATENTS
1,665,100  4/1928  Klaucke ................................. 59/78
3,127,980  4/1964  Lanham .............................. 74/250 R
3,358,524  12/1967 Patrignani ......................... 74/250 R
3,421,313  1/1969  Harada .................................... 59/78
3,439,494  4/1969  Hutton ..................................... 59/78

Primary Examiner—Charles W. Lanham
Assistant Examiner—Gene P. Crosby

[57] ABSTRACT

A drag chain is disclosed having a series of rectangular block links with a laterally projecting integral connection pin at each corner. Side bars are rotatably secured to the connecting pins.

6 Claims, 5 Drawing Figures

PATENTED FEB 5 1974 3,789,607
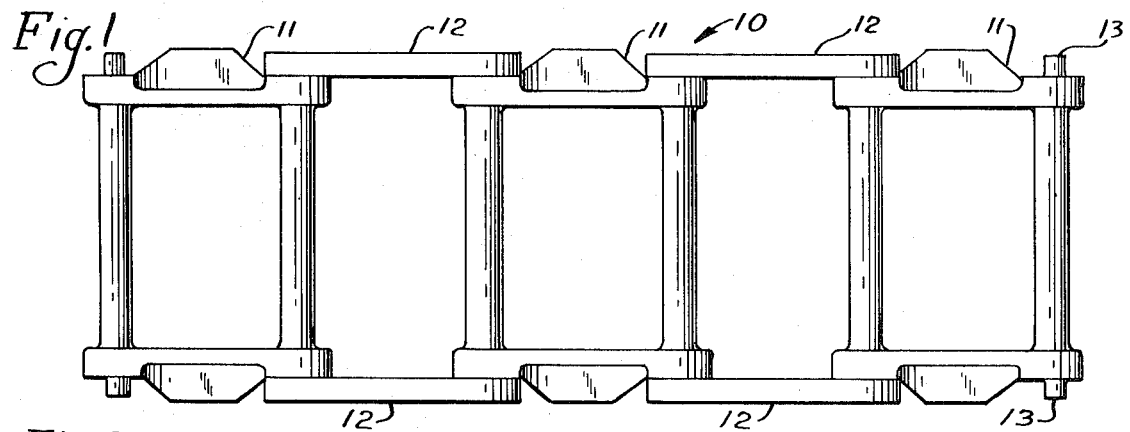
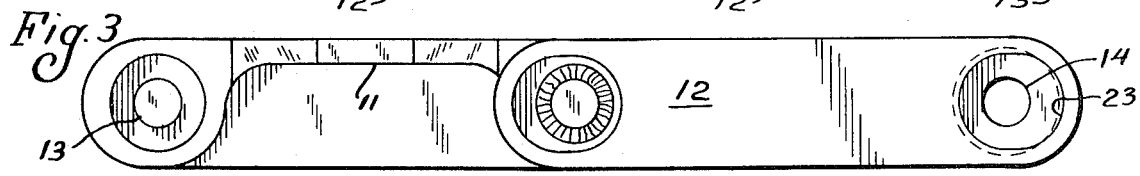
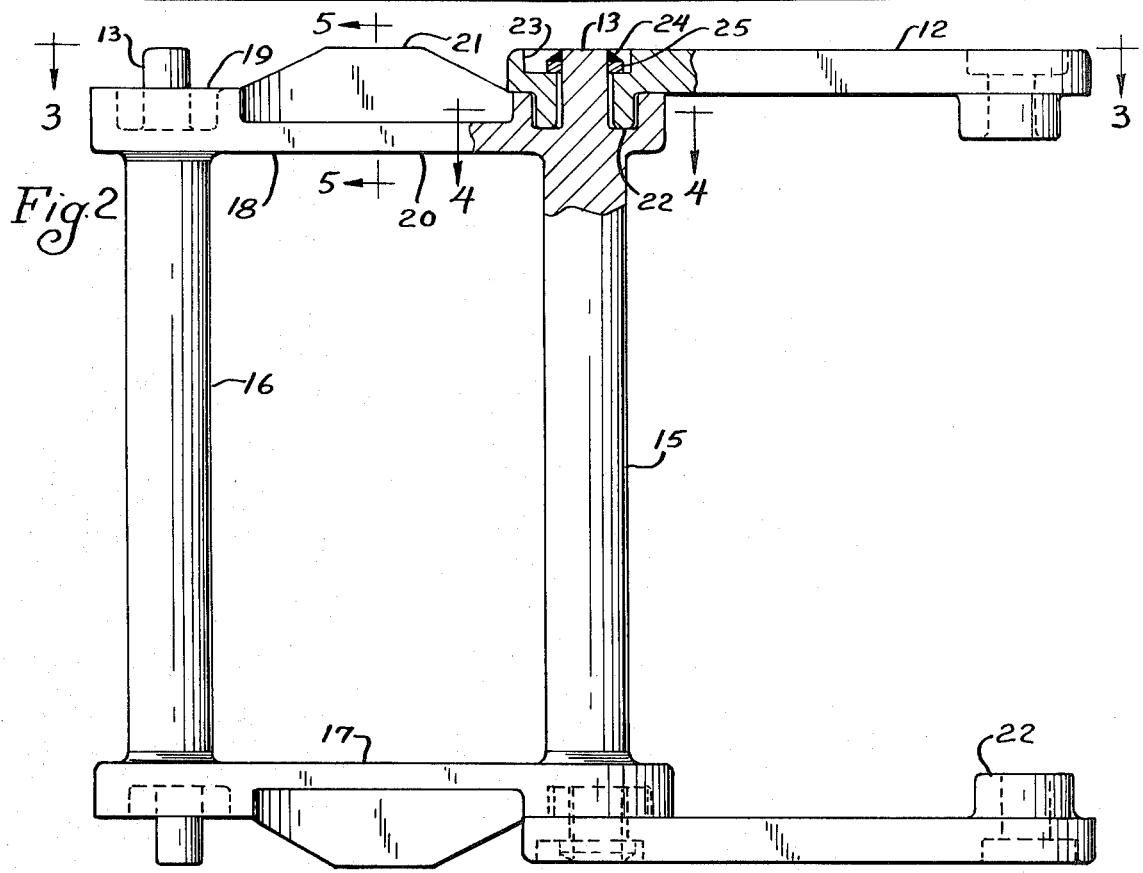
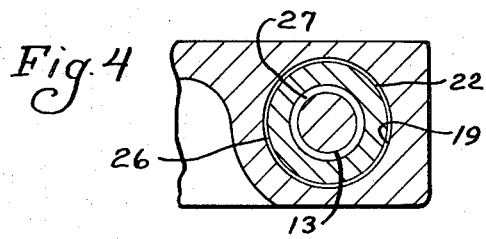
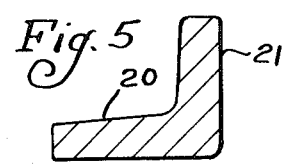

INTEGRAL CAST PIN TYPE CHAIN

BACKGROUND AND SUMMARY

This invention relates to a combination chain, and, more particularly, to a combination chain made up of a series of unitary generally rectangular block links connected by a plurality of apertured side bars. According to the invention, connection pins are integrally cast with the block links at the corners thereof, each link having an annular space about each pin to accommodate a boss projecting from about each aperture of the side bars. When the boss portions of the side bars are received in the corresponding annular space of the block links, means are further provided to rotatably secure the side bars to the connecting pins. In the preferred embodiment, a cap or block weld is attached to the upper part of the connection pin after the side bar has been fitted about the pin; this allows each side bar to rotate about the associated pins while still remaining attached thereto, which assures the necessary flexibility in the chain.

The combination chains of the prior art were sometimes characterized by certain deficiencies. For example, these constructions were deficient in lacking overall dimensional stability, particularly under heavy loads, and employing a large number of components per link, with the consequent possibility of loss and high manufacturing cost.

In contrast to this, the present invention provides an improved combination chain with increased strength, ease of construction, and low manufacturing cost. Additionally, because of the large bearing area in each block link, load stresses are distributed more evenly throughout the chain length, thereby eliminating the need for frequent replacement or repair of the chain. Finally, because of the minimum number of components utilized in the chain construction, the possibility of loss or breakage before or after chain assembly is reduced.

Other objects and advantages of the invention may be seen in the details of construction and operation as set down in this specification.

THE DRAWINGS

FIG. 1 is a plan view of a series of longitudinally aligned spaced-apart rectangular block links connected by a pluality of apertured side bars to form a length of combination chain;

FIG. 2 is an enlarged plan view partially in section of a rectangular block link with a pair of apertured side bars connected thereto according to the present invention;

FIG. 3 is a side elevational view of the showing of FIG. 2, and also partially broken away;

FIG. 4 is a fragmentary sectional view taken along sight line 4—4 of FIG. 2; and FIG. 5 is a fragmentary sectional view taken along sight line 5—5 of FIG. 2.

DETAILED DESCRIPTION

In the illustration given, and with particular reference to FIG. 1, a combination chain generally designated 10 is seen to include a series of longitudinally aligned, spaced-apart, rectangular block links 11, and a plurality of apertured side bars 12 which are in the spaces between adjacent block links and connect them. In general, each of the block links 11 has four laterally projecting connection pins 13 at the corners thereof, and which are integral with the link. The pins 13 are constructed and arranged to be received in the apertures 14 within the side bars 12 (see FIG. 3). Finally, means are pro-vided for rotatably securing the side bars 12 about the pins 13 to produce a strong, flexible combination chain.

Turning now to FIG. 2, the individual components used in constructing the combination chain of the present invention will be described. The block link 11 generally comprises a unitary cast element or body of substantially rectangular open configuration which defines thereby leading and trailing cross pieces 15 and 16 interconnected by side pieces 17 and 18. The link 11 at the ends of each of the leading and trailing pieces 15 and 16 is further equipped with a laterally facing, cup-shaped aperture 19. A pin 13 integral with the link 12 is positioned centrally within each cup-shaped aperture and projects laterally outward therefrom. Each pin is adapted to be received in the aperture of a side bar 12. In the preferred embodiment, each of the interconnecting side pieces 17 and 18 are generally L-shaped in transverse section (see FIG. 5). There it will be seen that the side piece 18 is equipped with a web portion 20 and an integral, laterally projecting flange 21. As can be appreciated from a consideration of FIG. 2, the lateral projection of the flange 21 is about in extent the same as the projection of the pins 13 associated therewith. Also, the flange 21 is generally trapezoidal in shape.

Still referring to FIG. 2, each apertured side bar 12 is a plate-like member or cast body generally elongated in the direction of chain movement and having at each end thereof an aperture 14 for interconnection with a block link 11. On one face of the side bar about each aperture 14, a hollow boss 22 is provided to project inwardly relative to associated block links during connection. In order to assure rotatable fit, a recess 23 is fashioned in the side bar 12 on the side opposite that having the boss 22. The recess 23 is adapted to receive means such as a block weld 24 for rotatably securing the side bar to the associated block link.

When the above-described elements are connected according to the present invention, a combination chain (as shown in FIG. 1) is produced. In practice, any desired length of chain can be sequentially produced by fitting the projecting boss 22 -- projecting from a side bar 12 -- into a corresponding annular space 19 fashioned about the connection pin 13. When so fitted, the recess 23 provided in the opposite face of the side bar 12 allows the block weld 24 to be positioned on the pin 13 to rotatably secure the side bar 12. In the illustration given, the block weld 24 includes an annular washer 25 connected to the pin 13 by a weldment. As can be appreciated, this simple procedure can be repeated to produce any desired length of chain with the aforementioned advantages. In the preferred embodiment, the annular space 19, the boss 22, and the pin 13 are so dimensioned to provide any lateral give necessary in the chain during use. As shown in FIG. 3, this allows a longitudinal give or play in the longitudinally aligned block links In this way the chain is given added flexibility to increase its usefulness as well as to provide for easier storage.

The combination chains described herein are useful in many diverse applications. It is particularly intended that they be used as a drag chain, but they could easily be adapted for use in an elevator or other conveyor operations.

In the illustrated embodiment, I provide more clearance between the pin 13 and the wall of the side bar defining the aperture 14 than I do between the boss 22 and the wall defining the recess or block link socket 19. This insures that the initial loading is transferred independently of the pin 13. The pin 13 only comes into the load transferring function after a certain amount of wear has occurred; for example, the clearance 26 (see FIG. 4) is 1/32 inch less than the clearance 27. Thus, there is only a gradual imposition of loading on the pin 13 as wear occurs, which further contributes to a long and successful operational life.

Recess 23 is not symmetrical relative to aperture 14 because it is anticipated that up to 1/4 inch of wear will occur on the chain before it is discarded. The oval recess 23 thus allows wear to take place without any bearing on the edge of the weld washer 25 which could cause problems of excessive stress on the weld or the end of the pin.

Although the invention has been described in conjunction with a preferred embodiment relative to integral cast pin type drag chains, it will be appreciated that other types of chain usages are well within the spirit and scope of the invention. For example, it is possible to make the chain with round cross sections, oval cross sections, possibly recessed or with attachments on the top, etc.

While in the foregoing specification a detailed description of an embodiment of the invention has been set down for the purpose of illustration, many variations in the details herein given may be made by those skilled in the art without departing from the spirit and scope of the invention.

I claim:

1. A combination chain comprising a series of longitudinally aligned, spaced-apart, rectangular block links and a plurality of apertured side bars in the spaces between adjacent block links connecting said block links, each of said block links having four laterally projecting connnection pins integrally cast therewith constructed and arranged to accommodate said bar apertures, each block link having an annular space about each pin, each side bar having a hollow boss about each aperture, each boss being received in a corresponding annular space, and means for rotatably securing said side bars to said pins.

2. The combination chain of claim 1 wherein each side bar is equipped with a recess about each aperture on the side of said side bar opposite to the side equipped with said boss to provide an open space about said pin for a block weld constituting said means.

3. A block link for use in a combination chain wherein successive block links are connected by pairs of apertured side bars, comprising a unitary cast element of generally rectangular open configuration and defining thereby leading and trailing cross pieces interconnected by side pieces, said element at the ends of each of said leading and trailing pieces being equipped with a laterally facing, cup-shaped aperture, a pin integral with said element centrally positioned within each cup-shaped aperture and projecting laterally outward therefrom and adapted to receive an apertured side bar.

4. The structure of claim 3 in which each side piece is equipped with an integral, laterally-projecting, generally trapezoidal-shaped flange, the lateral projection of said flange being about in extent the same as the projection of the pins associated therewith.

5. An interconnecting side bar for a combination chain made up of a plurality of generally rectangular, open-centered block links longitudinally aligned but spaced apart, each side bar being a plate-like member generally elongated in the direction of chain movement and having at each end thereof an aperture for interconnection with a block link, said side bar about each aperture having on one side thereof a hollow boss adapted to project inwardly relative to an associated block link and an outwardly facing recess adapted to receive means for rotatably securing said side bar to an associated block link.

6. The side bar of claim 5 wherein said outwardly facing recess is generally oval shaped to provide additional wear without stressing said means for rotatably securing said side bar.

* * * * *